F. EVES.
THRESHING MACHINE.
APPLICATION FILED SEPT. 22, 1916.
1,301,670.
Patented Apr. 22, 1919.
3 SHEETS—SHEET 3.
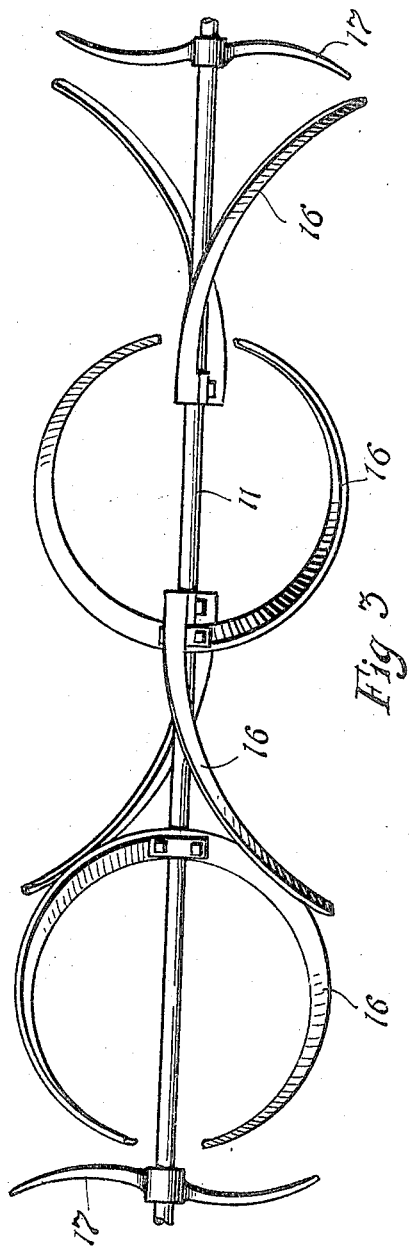
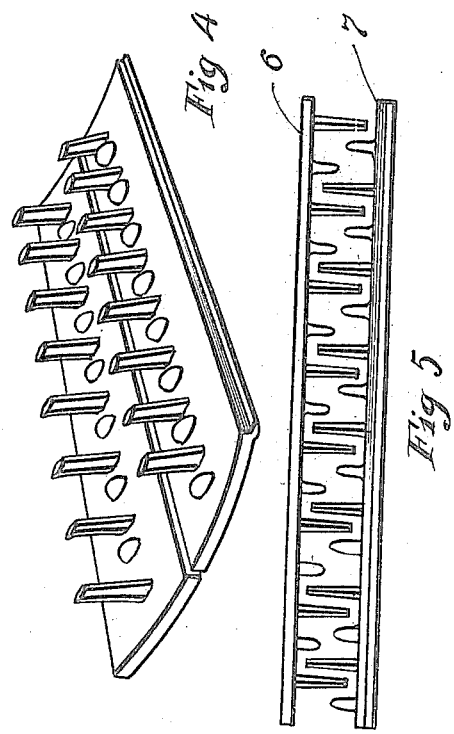
WITNESSES:
Geoffrey Holt
E. A. Paul
INVENTOR.
Frank Eves
BY Paul & Paul
ATTORNEYS.

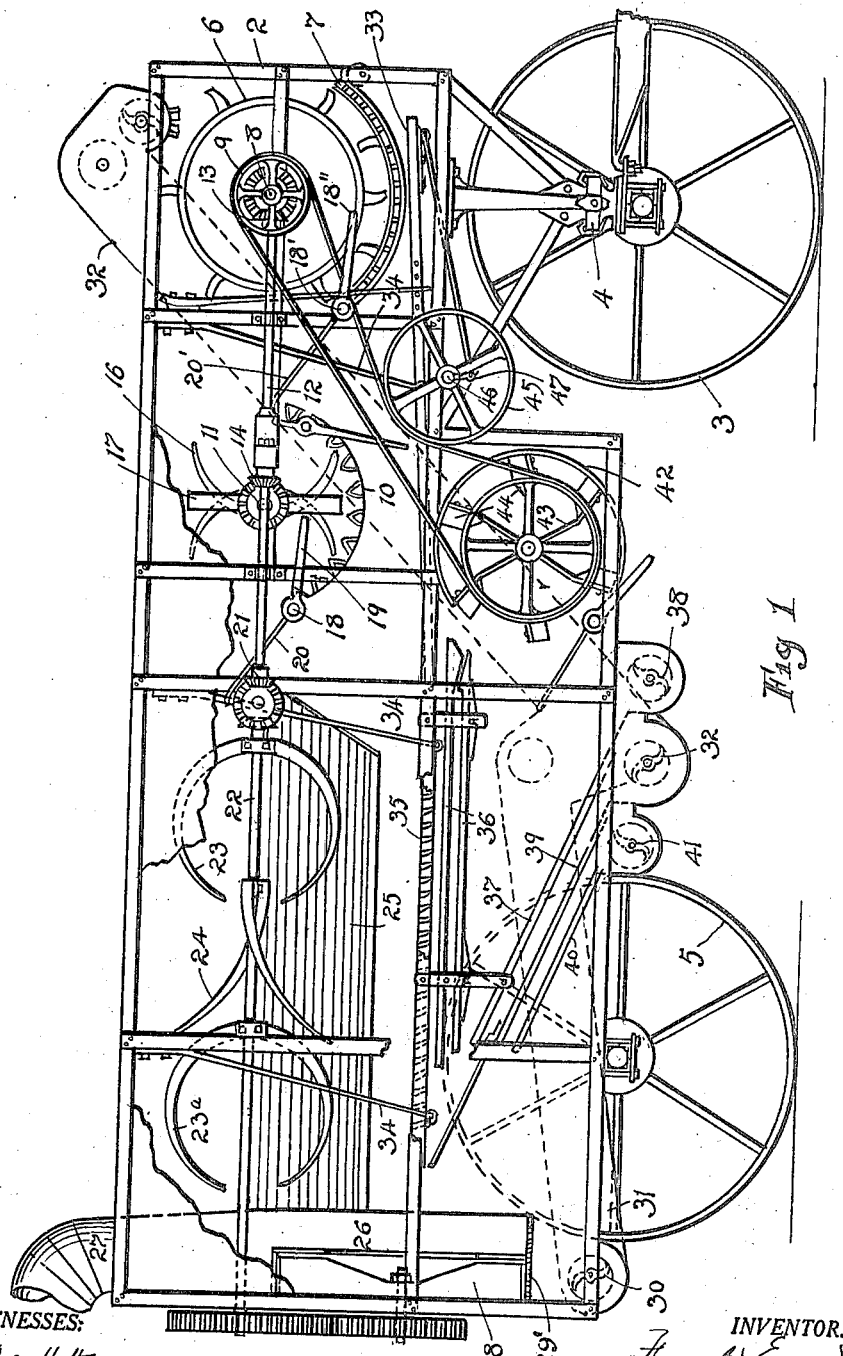

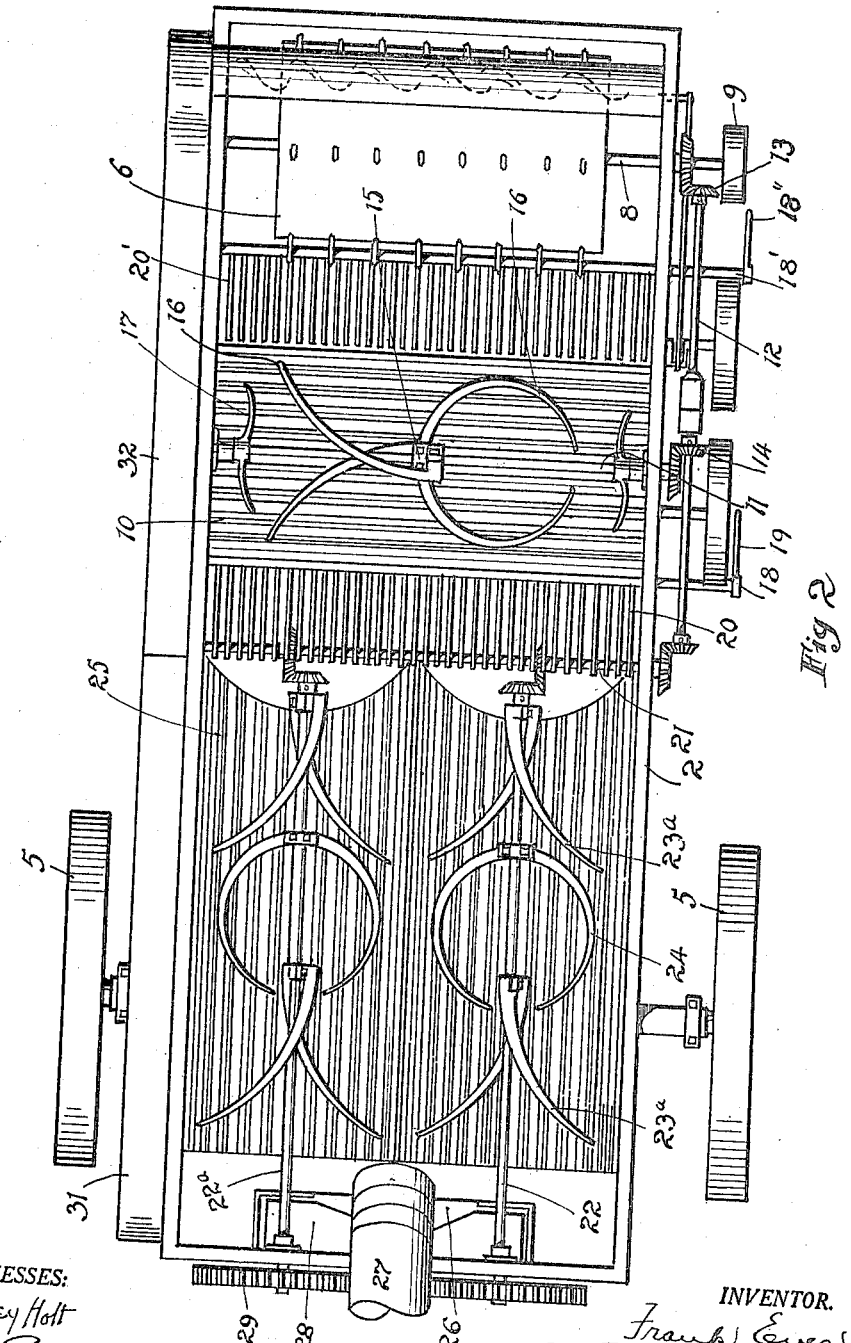

UNITED STATES PATENT OFFICE.

FRANK EVES, OF DEVILS LAKE, NORTH DAKOTA.

THRESHING-MACHINE.

1,301,670.  Specification of Letters Patent.  Patented Apr. 22, 1919.

Application filed September 22, 1916. Serial No. 121,649.

*To all whom it may concern:*

Be it known that I, FRANK EVES, a citizen of the United States, resident of Devils Lake, county of Ramsey, State of North Dakota, have invented certain new and useful Improvements in Threshing-Machines, of which the following is a specification.

The primary object of my invention is to provide a threshing machine in which the straw, after passing through the threshing cylinder, is subjected to a beating or whipping action and thrown from one side of the machine to the other and the length of its travel materially increased to the end that a more thorough separation of the straw and grain will be effected before the entrance to the wind stacker is reached.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of my improved threshing machine, with a portion of the wall and the casing broken away, Fig. 2 is a plan view of the same, Fig. 3 is a detail view showing the beater shaft, similar to the one shown in Fig. 2 but with an increased number of beater arms thereon, Figs. 4 and 5 are detail views of sections of the concave and the threshing cylinder.

In the drawing, 2 represents the frame of the machine, made preferably of angle bar metal on account of its strength and rigidity and comparatively light weight. The forward portion of the machine is supported on carrying wheels 3 having a suitable bearing 4 for convenience in turning, and the rear of the machine has carrying wheels 5. 6 is a threshing cylinder having a concave 7 and whereto the grain to be threshed is delivered. This cylinder has a suitable shaft 8 provided with a driven pulley 9 that is belted to some suitable source of power, not shown.

In the rear of the cylinder is a concave or trough 10 made preferably of angle bar material to form a grate and above this concave is a transverse shaft 11 that is driven from the shaft 8 through a shaft 12 and gears 13 and 14. The straw from the cylinder is discharged upon this grate. The concave or trough may have its floor or bottom formed of any other suitable material. Mounted on the shaft 11, preferably near the middle portion thereof, are hubs 15 provided with spirally arranged whipping arms 16. I employ two or more sets of these arms, each being twisted substantially a quarter turn to form right and left hand spirals, those of one pair projecting toward the wall of the machine on one side and those of the other pair toward the wall of the machine on the opposite side, the hubs of the arms being adjacent and near the middle portion of the shaft, as indicated in the plan view. These whipping arms receive the straw from the threshing cylinder and throw it right and left toward the sides of the machine, thoroughly beating and whipping it and threshing out the grain which may have escaped the teeth of the cylinder. The shaft 11 is also preferably provided with two pairs of auxiliary whipping arms 17 arranged near the ends of the shaft on each side of the arms 16, said auxiliary arms having the function of throwing the straw upwardly and backwardly on the grate as it is delivered at the sides of the machine by the action of the whipping arms. Adjacent to the grate 10 is a shaft 18 having an operating lever 19 and provided with a series of fingers 20 which project upwardly and backwardly from the grate and over which the straw is thrown by the whipping and auxiliary arms.

I prefer also to provide a shaft 18' on the receiving side of the grate 10, operated by means of a lever 18'' and provided with a series of fingers 20' which project upwardly and backwardly over the receiving side of the grate and direct the straw from the threshing cylinder to the grate, the feed of the straw being, of course, regulated by the angle of the fingers. By means of the lever 19 the shaft 18 can be adjusted to vary the angle of the fingers 20 with respect to the grate.

Near the rear ends of the fingers 20 is a transverse shaft 21 geared to the shaft 12 on the outside of the machine casing and also geared to parallel shafts 22 and 22ª which are mounted lengthwise on the machine on opposite sides of the longitudinal axis thereof and at right angles to the whipping shaft 11, the rear ends of said shafts 22 and 22ª being preferably journaled in the rear wall of the machine. Upon these shafts whipping arms 23, 24 and 23ª are secured at suitable intervals corresponding substantially to those on the beater shaft 11. These arms have a quarter twist or turn with right and left hand spirals, and operate to drive the straw lengthwise of the machine in troughs 25 arranged beneath the shafts 22 and 22ª. These troughs 25 may be made of any suitable material which will allow the grain to sift through the bottom while the straw is fed backwardly to the rear end of the troughs. The effect of these whipping arms on the straw is to subject it to a final threshing action, thoroughly separate it and remove any of the loose grain therein, and finally deliver it to the trunk 26 of a straw stacker 27 centrally mounted in the rear portion of the machine. This trunk extends across the machine from side to side and is provided with a straw stacker fan 28 that is driven through gears 29 on the shafts 22 and 22ª.

Below the stacker fan I prefer to provide a grate 29′, substantially elliptical in form and beneath said grate is a trough and screw conveyer 30 to receive the grain shaken out of the straw by the fan and said conveyer has an auxiliary elevator 31 leading to the primary elevator 32 by which the grain is returned to the cylinder to be passed through the sieves and cleaned.

33 is a grain pan, extending beneath the threshing cylinder and concave, hung on spring supports 34 and to the rear end of this grain pan is hinged a chaffer 35 which extends under the troughs 25. The chaffer is carried by supports 34 corresponding to those described. These supports are preferably of spring steel, allowing a vibrating movement of the grain pan and chaffer. Sieves 36 are suspended from the chaffer. Beneath the sieves 36 is a screen 37, forwardly and downwardly inclined to the grain conveyer 38. A similar screen 39 leads to the bottom of the elevator 32 and a tailings screen 40 for the waste to a transverse conveyer 41. 42 is a fan casing for the fan 43 having blades 44, preferably six in number, though this number may be increased or diminished as occasion may require. These fan blades are curved, as shown in the figure, and the throat of the casing is positioned to direct the blasts of air under and through the gang of sieves beneath the chaffer for blowing away the light refuse material backwardly to the straw stacker tube. This fan is belted to the threshing cylinder from which the pulley 45 on the crank shaft 46 having pitman connections 47 with the grain pan 43 is operated, and through the chaffer connection with the grain pan it and the sieves beneath are reciprocated.

In Fig. 3 I have shown a detail of the transverse beater shaft, with the whipping arms mounted thereon, corresponding substantially to those shown in Fig. 2 except that I have added a set of arms at each end of the shaft between the auxiliary beaters and the whipping arms in the center. These outer arms correspond substantially to those shown in the center of the shaft in Figs. 2 and 3, and I will designate them by the same reference numerals. The difference in the outline of some of the whipping arms in Fig. 3 as compared with others in the same figure is due to the different angle of the view point. The arms are all twisted the same way and correspond in shape and size.

I make no claim in this application to the sieve construction, reserving the claims for a companion application on substantially the same machine.

I claim as my invention:

1. In a threshing machine, a concave, whipping arms mounted to revolve on a transverse axis and extending from the middle portion of said concave outwardly toward the ends thereof to throw the straw transversely of the machine, and auxiliary whipping arms provided near the ends of said concave.

2. In a threshing machine, a pair of concaves arranged side by side extending lengthwise of the machine and having a raised portion between them, beater shafts mounted upon said concaves, beater arms mounted on said shafts, some of said arms having inwardly turned ends and others of said arms having outwardly turned ends and said arms operating to beat and whip the straw and work it laterally of said concaves and longitudinally thereof.

3. In a threshing machine, whipping arms mounted transversely of the machine for whipping the straw laterally thereof, similar whipping arms mounted lengthwise of the machine adjacent to said first named arms to receive the straw therefrom, said second named whipping arms operating to throw the straw laterally and longitudinally in the machine casing, troughs disposed beneath said groups of whipping arms and guiding arms mounted between said transverse troughs and said longitudinally arranged troughs for directing the straw from one to the other.

4. In a threshing machine, troughs arranged side by side, running lengthwise of the machine, whipping arms mounted above said troughs upon each side of the center of the machine for whipping and beating the straw and throwing it laterally and longitudinally of said troughs, and a stacker tube arranged to receive the straw from said troughs.

5. In a threshing machine, troughs arranged lengthwise therein side by side, means for delivering straw thereto, beaters mounted above said troughs for beating and whipping the straw and feeding it laterally and longitudinally of said troughs, a stacker tube communicating with the discharge end of said troughs to receive the straw therefrom, the lower walls of said stacker tube having a grating therein and a fan provided in said stacker tube above said grating.

6. In a threshing machine, whipping arms mounted transversely of the machine for whipping the straw laterally thereon, and similar whipping arms mounted lengthwise of the machine adjacent said first named arms to receive the straw therefrom, said second named whipping arms operating to throw the straw laterally and longitudinally in the machine casing.

7. In a threshing machine, a threshing cylinder and concave, whipping arms transversely mounted on the machine for throwing the straw laterally therein, whipping arms mounted longitudinally of the machine for throwing the straw both laterally and longitudinally therein and arranged in groups upon opposite sides of the machine, troughs disposed beneath said groups of whipping arms and a stacker tube communicating with said troughs.

8. In a threshing machine, a transversely arranged trough or concave, beater arms mounted to revolve above said trough for beating and whipping the straw, a trough arranged adjacent to said first named trough and extending lengthwise of the machine and receiving the straw from said transverse trough, a beater shaft arranged above said lengthwise trough and beater arms mounted on said shaft for throwing the straw laterally and working it longitudinally to the discharge end of said trough, and a stacker tube communicating with the discharge end of said trough.

9. In a threshing machine, a trough arranged lengthwise therein and means for delivering straw thereto, beaters mounted above said trough for beating and whipping the straw and feeding it laterally and longitudinally of said trough, a stacker tube communicating with the discharge end of said trough to receive the straw therefrom, the lower wall of said stacker tube having a grating therein and a fan provided in said stacker tube above said grating.

10. In a threshing machine a transversely arranged trough or concave, a beater shaft above the same, beater arms mounted in pairs on said shaft and projecting outwardly from the middle portion thereof toward the ends of said concave, said arms being curved and composed of flexible material for beating and whipping the straw and working it outwardly to the ends of the concave, concaves arranged adjacent said transverse concave and extending lengthwise of the machine, and receiving the straw from said transverse concave, beater shafts mounted above said lengthwise concaves and beater arms mounted on said shafts for throwing the straw laterally, and also working it longitudinally to the discharge ends of said lengthwise concaves, and means for receiving the straw from said discharge ends.

In witness whereof I have hereunto set my hand this 29" day of June 1916.

FRANK EVES.

Copies of this patent may be obtained for five cents each, by addressing the "Commissioner of Patents, Washington, D. C."